June 9, 1953 B. F. LEWIS 2,641,692

MOBILE RADIO TELEPHONE SYSTEM

Filed Aug. 27, 1949 2 Sheets-Sheet 1

INVENTOR
B. F. LEWIS
BY J. W. Schmied
ATTORNEY

June 9, 1953 B. F. LEWIS 2,641,692

MOBILE RADIO TELEPHONE SYSTEM

Filed Aug. 27, 1949 2 Sheets-Sheet 2

INVENTOR
B. F. LEWIS
BY J. W. Schmied
ATTORNEY

Patented June 9, 1953 2,641,692

UNITED STATES PATENT OFFICE 2,641,692

MOBILE RADIO TELEPHONE SYSTEM

Benjamin F. Lewis, Bayside, N. Y., assignor to Bell Telephone Laboratories, Incorporated, New York, N. Y., a corporation of New York Application August 27, 1949, Serial No. 112,775

10 Claims. (Cl. 250—6)

Figure 1:
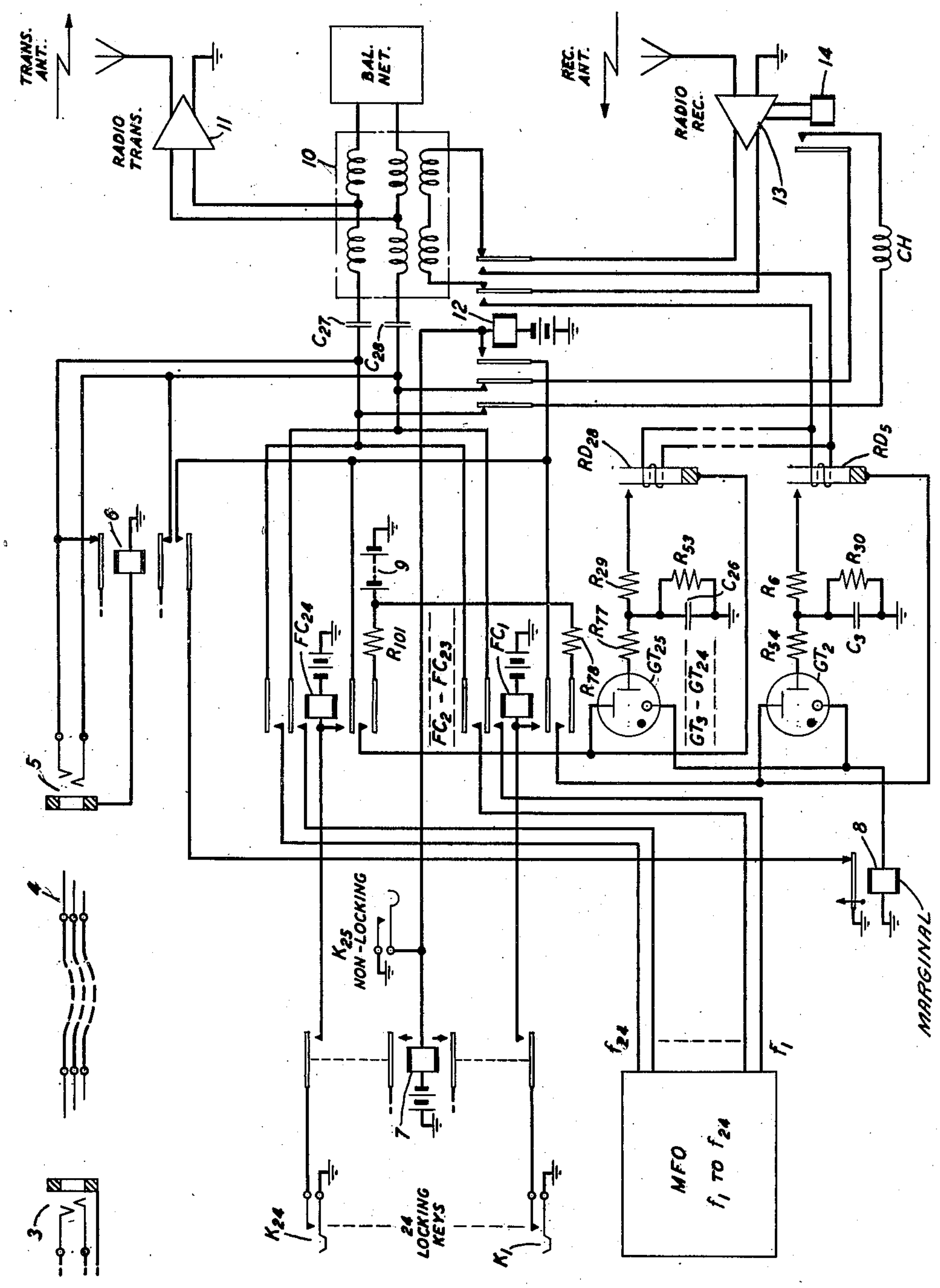

This invention relates to selective signaling systems and more particularly to a mobile radio station calling system in which selective tripping of the ringing signal is accomplished when the called subscriber answers a call. The invention is adapted to a mobile radio telephone system in which selective signaling is accomplished by simultaneous transmission of a combination of audio signal tones, each station being assigned an exclusive combination, as described in copending application of H. C. Harrison, Serial No. 767,487, filed August 8, 1947, now Patent No. 2,602,853 issued July 8, 1952.

An object of the invention is to provide automatic tripping of the central office calling signal when the called mobile subscriber responds by lifting his handset.

Another object of the invention is to automatically condition the central office circuits for talking, rather than signaling, promptly upon the answering of a calling signal by the called subscriber.

A further object of the invention is to prevent false interruption of the calling signal by the placing in operation of any mobile station, other than the called station, adapted to operate on the same radio frequency channel as the called station.

The need for the invention arises from the fact that in ordinary practice a large number of outlying mobile radio stations are adapted to operate on a common radio frequency channel, so that if one mobile subscriber attempts to originate a call while a calling signal is being transmitted from the central office to another mobile subscriber, the subscriber who first places his transmitter in operation thereby establishes communication with the central office and in this way an outgoing call from the central office may inadvertently be connected with an unwanted mobile subscriber who happens to place his transmitter on the air at the same time with the intention of originating a call himself. Furthermore, without some means for automatically tripping the ringing signal the operator must periodically interrupt her transmission of ringing signals and pause to listen and thereby ascertain whether the called subscriber has answered. Also without automatic tripping the called subscriber upon answering a call must wait until the ringing tone is interrupted by the operator before communication can be established between the called mobile station and the central office, thus giving rise to unnecessary delay in the completion of a call. The present invention overcomes these difficulties by providing means for automatically tripping the transmission of calling signals from the central office upon the called subscriber's answering a call, and thereupon immediately establishing talking conditions with such called subscriber. The invention may be employed with either manual or automatic mobile service offices. For simplicity of explanation, it is here disclosed as adapted to a manually controlled mobile service office.

Figure 2:
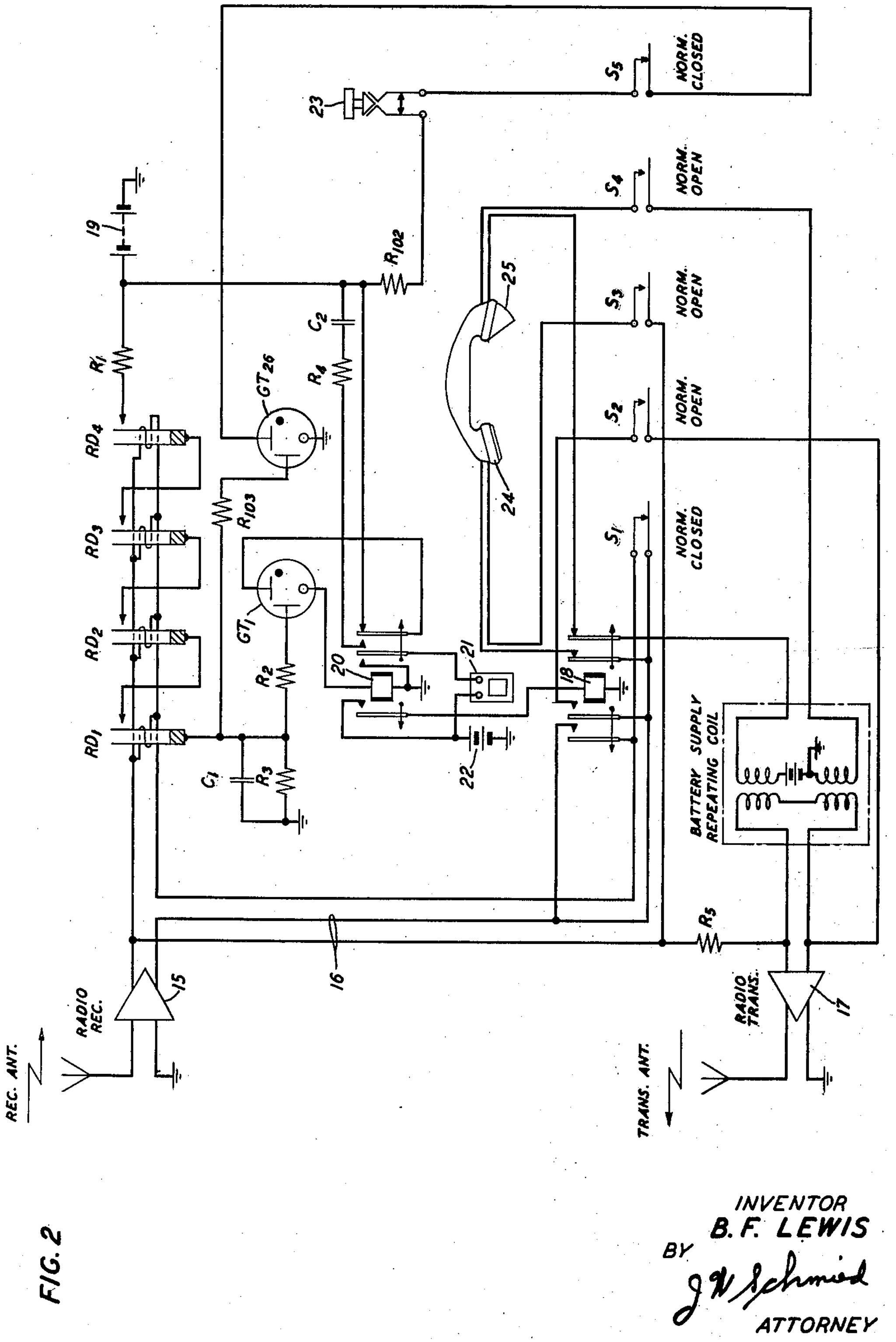

The manner in which the invention operates may be better understood from the following description of the accompanying drawings in which:

Fig. 1 represents a schematic diagram of the essential elements embodied in the central office switching circuit; and Fig. 2 represents a schematic diagram of the switching circuit at the mobile radio subscriber's station.

Referring now to Fig. 1 which represents the central office switching circuit for a mobile service exchange, we will assume that an incoming call is received by the mobile service operator over incoming trunk circuit 3 which may be any type of telephone trunk circuit. The operator at this manual exchange is advised by the calling subscriber that the call is for a particular mobile station, whereupon the operator then consults a directory to determine on what radio frequency channel the desired mobile station may be reached and what signaling code is required to signal the station. For purposes of explanation we will assume that the desired channel is associated with jack 5 and that the signaling code of the called mobile station is 1, 8, 15, 19. The operator makes the usual busy test of jack 5 connected with the radio channel line circuit and if this circuit is found free, she inserts plug 4 into jack 5 and proceeds to signal the mobile station. Battery from the operator's cord circuit over the sleeve lead operates the cut-off relay 6.

To signal the mobile station, the operator next sets four of the twenty-four keys $K_1$ to $K_{24}$ corresponding to the signal code indicated by the directory, in this case $K_1$, $K_8$, $K_{15}$, and $K_{19}$, in the operated position and momentarily operates non-locking key $K_{25}$. This operates multicontact relay 7 and causes the four frequency control relays $FC_1$, $FC_8$, $FC_{15}$, and $FC_{19}$ out of the bank of twenty-four frequency control relays $FC_1$ through $FC_{24}$ to operate and lock to ground via the make contact on the cut-off relay 6 and the break contact of the slow-release relay 8. The frequency control relays $FC_1$, $FC_8$, $FC_{15}$, and $FC_{19}$ connect signal tones of frequencies $F_1$, $F_8$, $F_{15}$, and $F_{19}$ of the twenty-four available signal tone frequencies from the multifrequency oscillator MFO to the talking circuit for transmission via condensers $C_{27}$ and $C_{28}$, hybrid coil 10, and radio transmitter 11 to all the mobile stations operating on this channel. The frequency control relays $FC_1$, $FC_8$, $FC_{15}$, and $FC_{19}$ also connect positive potential from battery 9 to each of the gas discharge tubes $GT_2$, $GT_9$, $GT_{16}$, and $GT_{20}$ out of the bank of twenty-four gas discharge tubes $GT_2$ to $GT_{25}$. In this manner, four gas discharge tubes are energized in detection channels corresponding to the four signaling frequencies that are being transmitted from the calling station.

Operation of non-locking key $K_{25}$ serves to operate relay 12, which locks to ground via relays 6 and 8. Relay 12 transfers the output of the central office radio receiver 13 to the bank of twenty-four tuned reed detectors $RD_5$ through $RD_{28}$ thereby conditioning the central office to respond automatically to a retransmitted signa from the mobile station.

Although this simplified circuit requires twenty-five keys of which the operator must work five to complete a call, it will be understood that more simplified control for the operator may be provided by the use of a conventional dial or operator's keyset in conjunction with a translator circuit of the type disclosed in copending application of D. F. Hoth and R. O. Soffel, Serial No. 56,186, filed October 23, 1948, now abandoned. With such an arrangement the use of thirty signal frequencies rather than twenty-four, as here disclosed, is to be preferred.

The signal tone source MFO may be any suitable generator of a plurality of alternating-current signals of the desired frequencies. A preferred form of signal frequency source is disclosed by Patent 2,541,320, issued February 13, 1951, to A. E. Bachelet. These signals may be transmitted through sharply selective circuits of the type disclosed by L. G. Bostwick, copending application Serial No. 38,130, filed July 10, 1948.

Referring now to Fig. 2, we will trace in detail the sequence of operations which occur at the mobile station upon reception thereat of the calling signal which we have just seen transmitted from the central office. The four signal tones that are transmitted simultaneously by the central office radio transmitter 11 are picked up by the radio receiver 15 at the mobile station, provided the mobile station is within range and its radio receiver is energized. Reception of these signal tones actuates the tuned reed detectors $RD_1$, $RD_2$, $RD_3$, and $RD_4$ in the manner disclosed by copending application of H. C. Harrison, Serial No. 767,437, filed August 8, 1947. Although other mobile stations which are tuned to receive on the same radio frequency channel will receive the same signal tones, in no other station will all four tuned detectors be operated as no other station has a selector circuit tuned to respond to the same combination of signal tones. It will be noted in Fig. 2 that the circuit from the output of the radio receiver 15 to the reed detectors $RD_1$ through $RD_4$ is closed through switchhook contact $S_1$, and that the bridging circuit 16 from the output of radio receiver 15 to the input of radio transmitter 17 is opened at switchhook contacts $S_2$ and $S_3$ and the contact of slow-release relay 18.

When all four reed detectors $RD_1$ to $RD_4$ are operated, positive potential from battery 19 is applied through resistor $R_1$ and the detector contacts to capacitor $C_1$. When sufficient charge is accumulated on $C_1$, the control gap of gas-filled tube $GT_1$ will be fired via resistor $R_2$. $R_1$ and $R_2$ are protective resistors which may be of the order of approximately 10,000 ohms each and $C_1$ is a small stabilizing capacitor which may have a capacity of the order of approximately .01 microfarad. Resistor $R_3$ shunted across capacitor $C_1$ is a drainage resistor which may be of the order of 1 megohm or over, serving merely to prevent the false accumulation of a charge on capacitor $C_1$.

Normally positive potential from battery 19 is applied to the anode of gas-filled tube $GT_1$ via the contact of slow-release relay 20 and hence this tube is fired whenever its control gap is operated. The current flow between the anode and cathode of $GT_1$ operates relay 20. When relay 20 is operated the anode of $GT_1$ is transferred from direct connection with battery 19 to potential from battery 19 via capacitor $C_2$ and resistor $R_4$. $C_2$ is of relatively large capacity; $R_4$ is a current-limiting resistor of relatively low resistance. A relatively large charge on capacitor $C_2$ combined with the slow-release characteristics of relay 20 serves to keep relay 20 operated for a sufficiently long interval to allow gas tube $GT_1$ to deionize if the incoming 4-frequency signal has been removed and if no further charge is being supplied to capacitor $C_1$ via the reed detector contacts. While relay 20 is operated, buzzer 21 sounds, circuits being closed from battery 22 through buzzer 21, through operated relay 20 to ground.

Relay 20 releases when the current through its windings drops off to a minimum value as a result of the discharge of capacitor $C_2$ and dissipation of the energy in the relay's magnetic field. Direct potential from battery 19 is again applied to gas discharge tube $GT_1$ and if the reed detectors $RD_1$ to $RD_4$ are still operating, $GT_1$ will again fire. As a result of this combination of gas discharge tube $GT_1$, slow-release relay 20, and capacitor $C_2$, buzzer 21 is caused to operate intermittently as long as the ringing frequencies are sent out from the central office.

Gas-filled tube $GT_{26}$ also fires at the same time that tube $GT_1$ operates and $GT_{26}$ remains lighted until its anode circuit is opened by push-button 23 or switchhook contact $S_5$. Resistors $R_{102}$ and $R_{103}$ are current-limiting resistors which may be of values approximately 10,000 and 100,000 ohms respectively. Gas discharge tube $GT_{26}$ provides a visual signal which remains operated if the incoming call is abandoned and thereby indicates to the mobile subscriber that an attempt has been made to signal his station during his absence.

While relay 20 is operated, the winding of relay 18 is connected to battery 22. Relay 18 has a slow-release characteristic such that the relay will hold up during normal pulsations of relay 20. When operated, relay 18 performs the following functions: (1) closes a shunt around switchhook contact $S_1$, (2) closes a connection in bridging circuit 16, (3) opens the circuits of the handset receiver and transmitter 24 and 25 respectively.

When the called party lifts his handset in response to a calling signal, switchhook contacts $S_1$ and $S_5$ are opened and contacts $S_2$, $S_3$ and $S_4$ are closed. $S_3$ closes after $S_4$ to avoid a battery click in receiver 24 when relay 18 is not operated. Tube $GT_{26}$ is extinguished by the opening of switchhook contact $S_5$, and the radio transmitter 17 of the mobile station is energized by separate means, not shown, when the subscriber answers a call.

Closure of the switchhook contact $S_2$ upon lifting of the handset 24—25 completes the bridging circuit 16 from the output of the mobile station radio receiver 15 to the input of the mobile station radio transmitter 17, thus permitting the four signal tones which are received at the mobile station to be impressed upon the mobile station transmitter and thereby retransmitted to the central office over the radio frequency channel on which the mobile station transmitter operates. Fixed resistor $R_5$ in circuit 16 serves to reduce the bridging effect of this circuit on the connection from the output of the radio receiver 15 to the reed detectors $RD_1$ through $RD_4$, and at the same time limits the level of the signal which is sent from receiver 15 into transmitter 17.

Recapitulating, the function of each of the switchhook contacts is as follows: $S_1$ closes the receiving circuit from receiver 15 to reed detectors $RD_1$ to $RD_4$ until relay 18 operates. After ringing signal has been tripped at the central office, and relay 18 released, $S_1$ opens the circuits to the reed detectors to eliminate their bridging loss from the talking circuits. $S_2$ keeps bridging circuit 16 open until the handset is lifted to avoid bridging loss of circuit 16 on the circuit to reed detectors $RD_1$ to $RD_4$ at the start of ringing. $S_3$ keeps open the circuit to the handset receiver 24 to avoid bridging loss on the circuit to the reed detectors $RD_1$ to $RD_4$ until relay 18 is operated. $S_4$ keeps open the circuit to the handset transmitter 25 while the handset is on the cradle. While ringing signals are received, relay 18 keeps the handset circuit open even though the handset is removed from its cradle. $S_5$ extinguishes gas discharge tube $GT_{26}$ if it is lighted when the handset is removed from its cradle.

Referring now once again to Fig. 1, we will trace the sequence of operations at the central office when the four signaling tones retransmitted from the mobile station radio transmitter 17 are picked up by the radio receiver 13 at the central office. From the output of receiver 13, the four signal tones go to the twenty-four reed detector units $RD_5$ through $RD_{28}$ which have their inputs connected in common. Each of these reed detector units at the central office has associated with it a gas-filled tube such as $GT_2$ associated with $RD_5$ and $GT_{25}$ associated with $RD_{28}$. As noted above in the previous reference to Fig. 1 positive potential from battery 9 is supplied to the gas discharge tube $GT_2$ through $GT_{25}$ by the frequency control relays $FC_1$ and $FC_{24}$ and as only four of the frequency control relays are operated at any one time, only the four corresponding gas discharge tubes are energized. As we saw before in our referenec to Fig. 1, upon selection of signaling frequencies $F_1$, $F_8$, $F_{15}$, and $F_{19}$ to call the mobile station in this case, the only tubes at the central office which are thereby energized, are $GT_2$, $GT_9$, $GT_{16}$ and $GT_{20}$.

Operation of the central office detector circuit, as disclosed by Fig. 1, will now be described with reference to incoming signal frequency $F_1$ as retransmitted from the mobile transmitter 17 of Fig. 2 and received by central office receiver 13 in Fig. 1. This reception of signal tone $F_1$ causes reed detector unit $RD_5$ at the central office which is tuned to resonate at the frequency $F_1$ to vibrate with such amplitude as to produce closures of its vibrating contact. Each closure of the vibrating contact connects positive potential from battery 9 through resistor $R_6$ to capacitor $C_3$.

When $C_3$ becomes sufficiently charged the voltage applied to the control gap of tube $GT_2$ through resistor $R_{54}$ causes the tube $GT_2$ to ionize. The other three signal tones $F_8$, $F_{15}$, and $F_{19}$ received simultaneously with $F_1$ similarly actuate their corresponding detector circuits in a like manner. Since the cathodes of all the gas tubes $GT_2$ through $GT_{25}$ are connected to the winding of relay 8 which is marginally adjusted so that it will not operate on less than the total anode-to-cathode current of four of these tubes, when the four signal tones, which are received back at the central office from the mobile station correspond to the four signal tones which were first transmitted from the central office to the mobile station, this combined current operates the relay 8. Resistors $R_6$ through $R_{29}$ and capacitors $C_3$ to $C_{26}$ are so chosen as to provide sufficient delay in the circuit to protect against false operation. Resistors $R_{54}$ to $R_{77}$ are current limiting, whereas resistors $R_{30}$ to $R_{53}$ are high resistance leakage units to prevent false charges accumulating on capacitors $C_3$ to $C_{26}$.

Resistors $R_{78}$ to $R_{101}$ are current-adjusting resistors whose value depends upon the operation characteristics of relay 8. When relay 8 operates, it removes the holding ground from relay 12 and from the four frequency control relays of the group $FC_1$ to $FC_{24}$ which were previously operated. The release of these four frequency control relays, $FC_1$, $FC_8$, $FC_{15}$, and $FC_{19}$, interrupts the transmission of the signaling tones and removes the positive potential of battery 9 from the four tubes $GT_2$, $GT_9$, $GT_{16}$ and $GT_{20}$. The release of relay 12 connects the transmission path from the output of the radio receiver 13 to hybrid coil 10 and connects the supervisory circuit from the contact of relay 14 through to the operator's cord circuit via jack 5. This supervisory circuit is held open by relay 12 so if a person in another mobile station other than the called station lifts his handset, the operator will not receive a false indication that the call has been answered. The inductance coil CH merely prevents excessive bridging loss to the transmission circuit.

When transmission of the signal tones is interrupted as described above, the reed detector units $RD_1$ to $RD_4$ at the mobile station of Fig. 2 cease to operate, gas tube $GT_1$ is extinguished, and relay 20 is released; buzzer 21 stops sounding and relay 18 releases. Release of relay 18 closes circuits to the handset receiver and transmitter 24 and 25, opens the circuit to the operating windings of the reed detectors $RD_1$ to $RD_4$ and also opens the bridging circuit 16. Circuits of both the mobile station and central office are now in the talking condition. Relay 14 is held operated by rectification of a portion of the incoming carrier from the mobile station and thereby provides supervision to the operator. When the party at the mobile station hangs up thereby deenergizing his mobile transmitter, relay 14 is released, the operator removes plug 4 from the jack 5 and the radio channel is free for another call.

When the mobile station handset is restored to its cradle, the mobile radio transmitter 17 is deenergized, switchhook contacts $S_1$ and $S_5$ are closed and contacts $S_2$, $S_3$, and $S_4$ are opened. The mobile station circuit is then in condition to receive ringing signals for another call.

If the called party at the mobile station does not answer, the operator removes plug 4 from jack 5, thereby releasing the relay 6 which in turn releases all relays in the group $FC_1$ to $FC_{24}$ and also relay 12, since the holding ground for each of the latter relays is opened by release of relay 6. At the mobile station of Fig. 2, $GT_1$ is extinguished when reed selectors $RD_1$ to $RD_4$ are no longer operated. Relays 18 and 20 are released and buzzer 21 stops sounding. Call indicator tube $GT_{26}$ remains lighted until the subscriber returns and either extinguishes this lamp by pressing push button 23 or by lifting the mobile station handset.

Relay 14 as the central office of Fig. 1 also provides answering supervision for a call originating from any mobile subscriber. The mobile service operator may handle such a call just as readily as any call originating from a fixed subscriber station.

It is to be understood that the invention is not limited to the specific arrangement herein disclosed, nor is it confined to mobile radio signalling systems, but the invention may be applied to multiparty station signaling via any communication medium. Other embodiments may be devised by those skilled in the art without departing from the spirit of the invention as defined by the foregoing specification and the appended claims.

What is claimed is:

1. A radio telephone system comprising a central office and a plurality of outlying radio stations, each of said stations having a radio transmitter and a radio receiver, means at said central office for calling a selected one of said stations by transmission therefrom of a distinctive call signal, switching means at a called station under control of a local subscriber for connecting the output of the radio receiver thereof to the input of the radio transmitter thereof, whereby a received call signal is retransmitted, receiving means and cooperating switching means at said central office to interrupt transmission therefrom of said call signals upon reception thereat of said retransmitted signals, and further switching means at said called station operable upon interruption of said call signals transmitted from said central office to condition said station for talking.

2. A radio telephone system comprising a central office and a plurality of outlying radio stations, each of said stations having a radio transmitter and a radio receiver, means at said central office for transmitting therefrom simultaneously a plurality of signaling tones selected from a larger group of said tones to correspond with the distinctive call signals of a particular one of said outlying stations to be called, selective receiving means at said called station responsive to said selected combination of signal tones and adapted to produce a call signal indication thereat, switching means at said called station under control of a local subscriber for connecting the output of said radio receiver thereat to the input of said radio transmitter thereat whereby said received signal tones are retransmitted, receiving means at said central office adapted to receive said retransmitted signal tones and switching means at said central office cooperating with said receiving means thereat to compare said received signal tones with said selected signal tones originally transmitted therefrom and upon correct comparison of said received tones with said transmitted tones to interrupt transmission therefrom of said tones, and further switching means at said called outlying station operable upon interruption of reception thereat of said calling signal tones to interrupt said subscriber's calling indication and to condition said station for talking.

3. A selective signaling system comprising a calling station and a plurality of outlying stations all interconnected therewith by a common transmission medium, means at said calling station for transmitting selected combinations of signaling tones therefrom, means at each of said outlying stations for receiving said transmissions, selective receiving means at each of said outlying stations responsive to a distinctive combination of signal tones for each station, calling indicating means at each outlying station associated with selective receiving means and operable thereby upon reception thereat of said calling signal distinctive to said station, switching means at each of said outlying stations cooperating with transmitting means thereat for connecting the output of the receiving means thereat to the input of the transmitting means thereat whereby the received call signal is retransmitted, receiving means at said calling station responsive to said retransmitted called signal and cooperating switching means thereat to interrupt the transmission therefrom of said call signal upon reception thereat of said retransmitted signals, and further switching means at said called outlying stations operable upon interruption of said called signal to interrupt said signal indication thereat and to condition said called outlying stations for talking.

4. In a voice frequency selective signaling system, means at a calling station for transmitting simultaneously a selected plurality of voice frequency signals, means at a called station adapted to produce a signal indication upon reception of said distinctive combination of signals, means at said called station for retransmitting said received call signal under the control of a local operator, receiving means at said calling station adapted to receive said retransmitted call signal, comparative means at said calling station adapted to compare said received retransmitted call signal with said originally transmitted call signal and switching means controlled by said comparative means to interrupt transmission of said calling signal from said calling station and to condition said calling station for talking, and further switching means at said called station operable upon interruption of said calling signal to condition said called station for talking.

5. A signaling system including a calling station and a plurality of outlying stations interconnected therewith by a common transmission medium, each of said outlying stations comprising a plurality of tuned elements responsive to waves of frequency corresponding to their individual tunings, means at a calling station for generating a plurality of waves corresponding in frequency to the tuned elements at an outlying station, means for causing the transmission of said waves to and their reception at an outlying station, switching and transmitting means at said outlying station under the control of a local operator for retransmitting said waves to said calling station, switching means cooperating with receiving means at said calling station for interrupting the transmission therefrom of said waves upon the reception thereat of said retransmitted waves and to condition said calling station for talking, and further switching means at said outlying station responsive to the interruption of said waves to condition said outlying station for talking.

6. A signaling system including a calling station and a plurality of outlying stations interconnected by a common transmission medium, each of said outlying stations comprising a tuned selector responsive to electrical currents of distinctive frequency, means at a calling station for selecting calling currents of frequencies distinctive to the tuned selector at an outlying station to be called, means at said calling station for transmitting said selected calling currents to said called station, means at said called outlying stations for receiving said calling currents from said calling station, selector means at said called outlying station responsive to said selected calling currents and operable thereby to produce a signal indication thereat, switching and transmitting means at said outlying station under the control of a subscriber thereat to cause retransmission therefrom of said selected calling currents, receiving means at said calling station adapted to receive said retransmitted calling currents, comparator means at said calling station for comparing said received retransmitted calling currents thereat with said originally transmitted calling currents therefrom, switching means at said calling station operable by said comparator to interrupt transmission therefrom of said selected calling currents and to condition said calling station for talking, and further switching means at said outlying station operable upon interruption of said calling currents to condition said outlying station for talking.

7. In a multiparty station signaling system, a calling station and a plurality of outlying stations interconnected by a common transmission medium, said outlying stations comprising a plurality of tuned elements adapted to respond to distinctive signals in accordance with a predetermined code, means at said calling station for transmitting a plurality of distinctive signals of any desired combinations, means at each outlying station controlled by reception thereat of a particular combination of signals corresponding to the code of said station for producing a call signal indication at said outlying station, transmitting means at each of said outlying stations, switching means under the control of a subscriber at said outlying stations for connecting the output of said receiving means thereat to the input of said transmitting means thereat whereby said received calling signal may be retransmitted, receiving means at said calling station responsive to said retransmitted calling signal from said outlying stations, further means at said calling station controlled by the reception thereat of said retransmitted calling signal to interrupt transmission therefrom of said calling signal, and further switching means at said outlying stations operable by the interruption of said calling signal to condition said station for talking.

8. In a multiparty station signaling system, a calling station and a plurality of outlying stations interconnected by a common transmission medium, each of said outlying stations comprising a plurality of tuned elements adapted to respond to a distinctive combination of signaling tones in accordance with a predetermined code, means at said calling station for simultaneously transmitting a plurality of distinctive signal tones in any desired combination, means at each outlying station controlled by simultaneous reception thereat of a particular combination of signaling tones corresponding to the code of said station for producing a signal indication, transmitting means at each of said outlying stations, switching means under the control of a subscriber at a called outlying station for connecting the output of said receiving means with the input of said transmitting means whereby said received calling signal tones are retransmitted, receiving means at said calling station responsive to said retransmitted signal tones from said outlying stations, and further means at said calling station adapted to interrupt the transmission therefrom of said calling tones upon the reception thereat of said retransmitted calling tones and to condition said calling station for talking, and further switching means at said called outlying station responsive to interruption of said calling signal tones to disconnect the output of said receiving means from said transmitting means and to condition said called station for talking.

9. In a multiparty station signaling system, a calling station and a plurality of outlying stations interconnected by a common transmission medium, said outlying stations comprising a plurality of tuned vibrator elements adapted to be set into vibration upon reception of a distinctive combination of alternating-current signals in accordance with a predetermined code, means at said calling station for transmitting a plurality of alternating-current signals in accordance with an assigned code to call any of said outlying stations, selective receiving means at an outlying station comprising said tuned vibrator elements adapted to respond to a particular combination of alternating-current signals received from said calling station, transmitting means at said outlying stations, switching means under the control of a local operator at each of said outlying stations for applying said received alternating signal currents to said transmitting means thereat whereby said signaling currents are retransmitted, receiving means at said calling station, comparator means at said calling station cooperating with said receiving means and switching means adapted to interrupt the transmission therefrom of said calling signals upon the reception thereat of retransmitted identical calling signals, further switching means at said outlying stations to prohibit the interconnection of said receiving means with said transmitting means thereat except when the received calling signal corresponds to the distinctive code of said outlying stations, and further switching means at said outlying stations operable upon interruption of said calling signal to condition said stations for talking.

10. In a multistation selective signaling system, a plurality of outlying stations capable of being called, a calling station including means thereat for transmitting alternating currents, a channel of transmission at least in part connecting said calling station with said plurality of stations, each of said plurality of stations being provided with resonantly responsive devices selectively operable by alternating current of characteristic individually unique for each outlying station, transmitting means at each of said outlying stations, call indicating means at said outlying stations operable upon reception thereat of alternating current of characteristic individually unique for each outlying station, switching means at each outlying station operable locally upon reception thereat of alternating current of characteristic corresponding to the individual code for each station to connect said received alternating current with said transmitting means whereby said distinctive received alternating currents are retransmitted, means at said calling station for receiving said retransmitted currents and comparing same with said originally transmitted currents, means at said calling station for interrupting transmission therefrom of said alternating current upon correct comparison and to condition said calling station for talking, and further means at said calling station responsive to interruption of said alternating current to disconnect said resonantly responsive devices from said transmitting means thereat and to condition said station for talking.

BENJAMIN F. LEWIS.

References Cited in the file of this patent

UNITED STATES PATENTS

| Number | Name | Date |
|---|---|---|
| 1,910,972 | Stokley | May 23, 1933 |
| 2,064,958 | Taylor | Dec. 22, 1936 |
| 2,148,578 | Pullis | Feb. 28, 1939 |
| 2,198,901 | Boswau | Apr. 30, 1940 |
| 2,265,056 | Bowers | Dec. 2, 1941 |
| 2,277,469 | Whitelock | Mar. 24, 1942 |
| 2,280,421 | Chappell et al. | Apr. 21, 1942 |
| 2,326,290 | Dickieson | Aug. 10, 1943 |
| 2,431,167 | Byrnes | Nov. 18, 1947 |
| 2,521,696 | De Armond | Sept. 12, 1950 |